Dec. 11, 1945.  M. KATCHER  2,390,539
OIL FILTER
Filed June 19, 1943  2 Sheets-Sheet 1
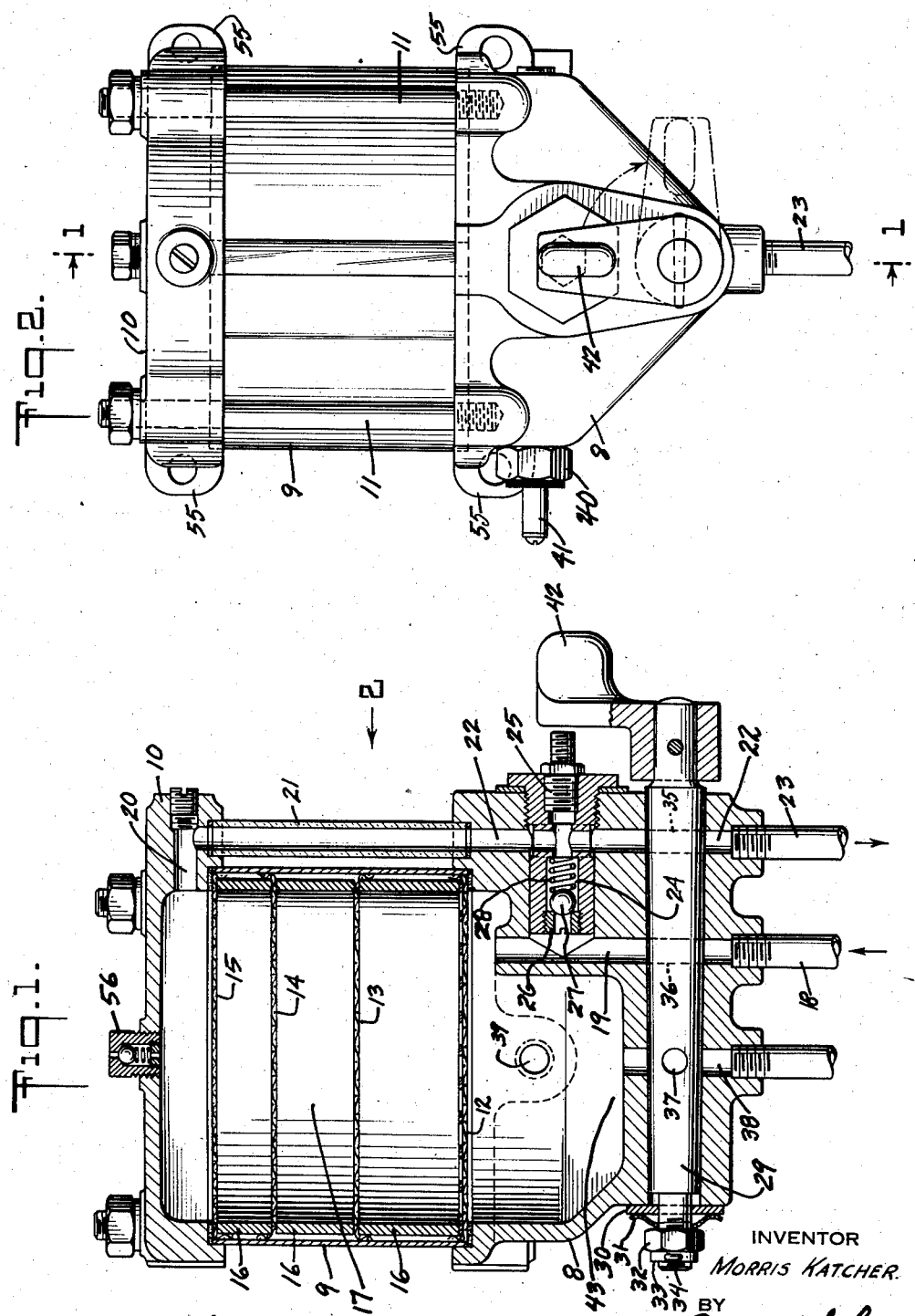
INVENTOR
MORRIS KATCHER.
BY
Emanuel Scheyer
ATTORNEY Dec. 11, 1945.    M. KATCHER    2,390,539
OIL FILTER
Filed June 19, 1943    2 Sheets-Sheet 2
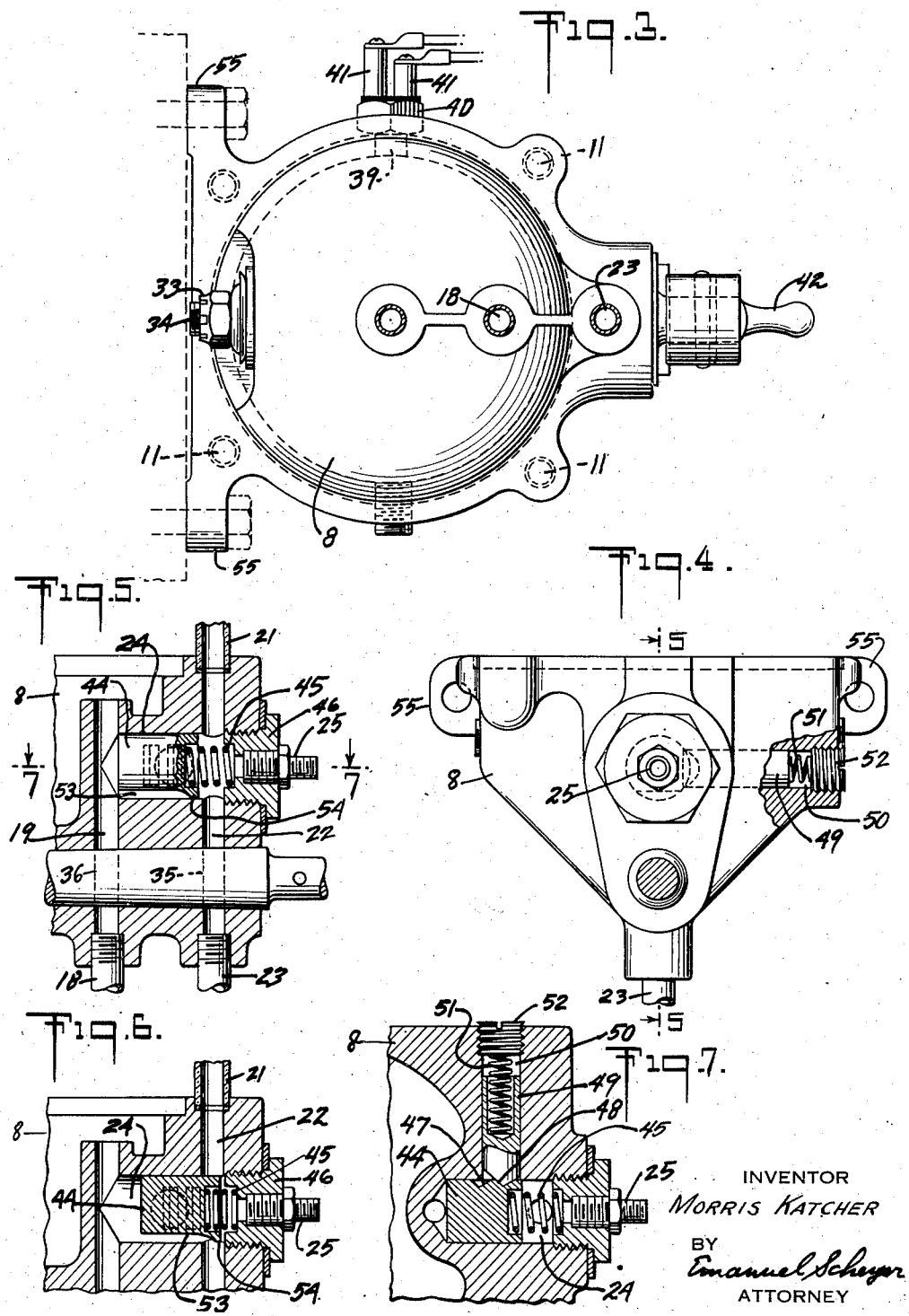
INVENTOR
MORRIS KATCHER
BY
Emanuel Scheyer
ATTORNEY Patented Dec. 11, 1945

2,390,539

UNITED STATES PATENT OFFICE 2,390,539

OIL FILTER

Morris Katcher, New York, N. Y.

Application June 19, 1943, Serial No. 491,454

9 Claims. (Cl. 210—185)

This invention relates to an oil filtering device which when clogged from filtering oil is adapted to be cleaned by sending air or other fluid through it in reverse direction. The filtering means, such as screens, is used over again when cleaned, instead of being discarded as is the case in many filters of the prior art. The filtering means, for example a plurality of spaced screens placed horizontally, has openings, interstices or pores which become smaller the nearer they are to where the oil leaves, that is the screen first passed through by the oil has larger openings than the last screen passed through. As explained hereafter, this increases the efficiency of the filtering means, and also is effective in cleaning said means when air is sent through in a reverse direction. It also aids in a self cleaning action of the filtering means, the particles of impurities dropping down by gravity from the horizontal screens and passing through the successively larger openings of the successively lower screens.

In my copending application Serial No. 468,044, the bypass duct passes upward through the center of the screens. In the present invention, the difficulties in construction resulting from this are avoided by having the bypass duct receive the oil from the chamber below the bottom screen, thus avoiding the necessity of having the bypass duct pass through the screens.

Other objects and advantages will become apparent upon further study of the description and drawings, in which:

Fig. 1 is a cross section of the filter.

Fig. 2 is an elevation looking in the direction indicated by the arrow 2 alongside of Fig. 1.

Fig. 3 is a bottom view of the filter.

Fig. 4 is an elevation of the bottom casting of the filter shown by itself taken as in Fig. 2, but with the crank handle and telltale switch removed, a modified form of valve being used and a part of the casting being broken away.

Fig. 5 is a partial section taken along the line 5—5 of Fig. 4.

Fig. 6 is a partial section taken as in Fig. 5 but showing the valve plug in the bypass duct in open position, and Fig. 7 is a partial section taken along the line 7—7 of Fig. 5.

The housing for the filter comprises three principal parts, namely: heavy bottom casting 8, intermediate cylindrical sheet metal portion 9 and top casting 10. The three parts of the housing are clamped together by bolts 11. Inside the housing are mounted the filtering means. In the embodiment shown it is a plurality of horizontal filter screens of wire, cloth or other suitable filtering material. In the particular embodiment shown there are four screens numbered respectively 12, 13, 14 and 15 passing up from the bottommost one. The screens are held in position by separator rings 16. The interstices of the bottom screen 12 are larger than those of screen 13, those of screen 13 larger than those of screen 14, and those of screen 14 larger than those of screen 15. In the operation of the filter, the oil passes up from below bottom screen 12 passing upward through the screens with successively finer interstices, the same principle being employed herein as in my copending applications Serial Nos. 468,044 and 478,224, in which the interstices of successive layers or screens of filtering material become smaller. The openings, interstices or pores become smaller the nearer the filtering material is to where the oil leaves the filter, the top of chamber 17 in the present instance. The finer particles of impurities in the oil, as the latter normally flows through the filtering means, pass through the coarser openings near where the oil enters, that is bottom screen 12, until they reach openings small enough to stop them. Particles of larger size are stopped before they have traveled through as far as the finer particles. This variation in the size of the interstices increases the filtering capacity because it tends to prevent the smaller particles from clogging up the filter at the side where the oil enters by permitting said smaller particles to pass through until they meet with a finer layer. By so passing they move away from the entrance leaving it free to handle the larger particles only. When the normal flow is reversed through the filter for cleaning, as when air is blown through in reverse direction, the particles are able to pass backwards through the successive screens as said particles reach openings increasing in size.

Ears 55 are used for mounting the filter on a support.

The inlet to chamber 17 is provided by pipe 18 and inlet passage 19 in bottom casting 8. Pipe 18 is connected to the pressure side of a lubricating system, not shown, said system for example as that used for an internal combustion engine. The outlet from chamber 17 is provided by passage 20 in top casting 10 which leads from said chamber above top screen 15. The rest of the outlet comprises pipe 21, passage 22 in bottom casting 8 and pipe 23 which leads back to the lubricating system. A bypass duct 24, connects the inlet from inlet passage 19 with the outlet at outlet passage 22. Between outlet passage 22 and the outside of casting 8 is a passage containing an air connection plug 25. Inside the air plug, not shown, is a check valve permitting air or other fluid to be forced into the outlet but not permitting its escape therefrom. Duct 24 also has a check valve in it comprising a seat 26, a ball 27 and a spring 28 normally holding the ball on said seat. When the pressure in chamber 17, due to the clogging of screens 12, 13, 14 and 15 becomes great enough to overcome the pressure of spring 28, ball 27 is unseated and the oil flows from inlet passage 19 through duct 24 into outlet passage 22, without first passing through the screens to the top side of screen 15.

Tapered valve stem 29 is rotatably mounted in bottom casting 8. It is held tightly seated therein by means of washer 30, plate spring 31 and nut 32 with its castle portion 33, said nut being screwed upon a threaded extension 34 of said stem. Stem 29 is provided with parallel ports 35 and 36, the former for the position of the stem shown in Fig. 1 being in line with outlet passage 22 and the latter in line with inlet passage 19. A third port 37 is provided in stem 29 which is at right angles to the other two and therefore when the other two permit the flow of oil between the filter and the lubricating system, port 37 blocks off cleanout passage 38.

A port 39 is provided in bottom casting 8, which transmits whatever pressure is developed in the bottom or sump portion of chamber 17 to pressure actuated switch 40. Switch 40 is of such a type that when it receives a pressure exceeding a predetermined amount, it will close the circuit between its terminals 41. Such a switch is described in my Patent No. 2,164,821, July 4, 1939. Terminals 41 are in the circuit of a signalling or telltale device, not shown, which could, say, be located on the instrument board of an automobile or airplane. When filter screens 12, 13, 14 and 15 become clogged with impurities filtered out from the oil, the pressure rises in the sump or bottom portion of the chamber 17 sufficiently to close the circuit between terminals 41. The telltale or signal is operated thereby indicating that the filter needs cleaning.

When the filter is in service, oil from the lubricating system is forced into inlet pipe 18, up through inlet passage 19 into the lower or sump portion of chamber 17. The oil then passes upward successively through filter screens 12, 13, 14 and 15 into the space above the latter from whence it passes out of chamber 17 by means of passage 20, pipe 21, passage 22, including port 35 and pipe 23 back to the lubricating system. At this time the pressure in the chamber below screen 12 is not sufficient to unseat ball 27 or operate telltale switch 40. Continued flow of oil through the filter clogs up the filter screens until the pressure rises sufficiently to operate telltale switch 40 when an indicating device, not seen, furnishes a warning that the filter should be cleaned. Further use of the filter without cleaning clogs up the filter screens to an increasing extent until the pressure in the lower portion of chamber 17 rises sufficiently to unseat ball 27 against the pressure of its spring 28. When this occurs, the oil flows through bypass duct 24 into passage 22 and out pipe 23 back to the lubricating system without having passed through the filter screens. When it is desired to clean the filter, valve stem 29 is turned 90 degrees by means of handle 42. Turning handle 42 exposes the end of air connection 25. An air hose, such as is found in the compressed air supply of most gasoline stations can then be pressed against the outer end of connection 25. The air pressure thus received seats ball 27 and air is forced into the top of chamber 17 through passage 20. The air proceeds down through filter screens 15, 14, 13 and 12 forcing the particles clinging to them down into the sump or bottom portion of chamber 17 and out cleanout passage 38. As the size of the openings or interstices of the successive screens increases on the way down, the smaller particles from above are carried through the larger openings of the screens below. Even in the normal operation of the filter, a certain amount of this action takes place due to gravity pulling down the particles. During bypassing, there is an increase of the effect of gravity because it is not counteracted by the upward flow of the oil through the screens which takes place during normal operation. When the filter is not in operation, as when the engine of which the lubricating system is a part, is not running, the filter tends to be self cleaning, the particles dropping down through the successively coarser screens to the sump portion 43 of chamber 17 below bottom screen 12 and below the top of inlet passage 19. By keeping the top of inlet passage 19 well above the bottom of the sump, particles which have settled to the bottom will not be too greatly disturbed during normal operation of the filter as the oil enters same from the top of said passage.

In Figs. 4-7 is shown a modified form of valve in duct 24. This valve is releasably locked in closed or forward position and releasably locked in open or rear position. Because of the locking feature, the valve is not subject to rattling and vibration, and when once in rear or open position remains there until forced to closed position. The valve comprises a valve plug 44 slidably mounted in duct 24. Spring 45, which reacts at one end against valve plug 44 and at the other end against sleeve plug 46, holds the valve plug in its forward position. The side of valve plug 44 is provided with a pair of V-shaped notches; the surface 47 of the left hand notch, Fig. 7, makes a lesser angle with the longitudinal axis of valve plug 44 than does surface 48 of the right hand notch. A pawl 49 is slidably mounted in a hole 50 provided in bottom member 8. Spring 51 reacting against screw plug 52 and pawl 49, forces the end of the latter into one of the notches in the side of valve plug 44. Said valve plug is normally kept in forward or closed position by the force developed by the pressure of spring 45 and the force developed by the pressure of pawl 49 against the greater inclined surface 48. The oil pressure in the bottom portion of chamber 17 against the forward end of valve plug 44 must rise sufficiently to overcome the forces noted above. As previously noted, the oil pressure will rise sufficiently to effect this when filter screens 12—15 become sufficiently clogged. Once there is sufficient oil pressure, valve plug 44 will move to its backward position. When valve plug 44 is moved to said latter position, pawl 49 engages lesser inclined surface 47. Before any further backward motion of valve plug 44 can take place, the oil pressure forcing it back is reduced by the opening of bypass duct 24, through groove 53 in the bottom of said plug. Groove 53 starts at the forward end of valve plug 44 but extends only part way to the back end leaving a lip 54. When valve plug 44 is in its forward position as seen in Fig. 5, lip 54 prevents the oil from passing from inlet passage 19, through groove 53 into outlet passage 22. Further pressure causes valve plug 44 to assume the position shown in Fig. 6, where groove 53 is shown in communication with outlet passage 22. With valve plug 44 in this latter position, oil entering passage 19 is bypassed through duct 24 into outlet passage 22 without reaching or passing through the filtering screens. When valve plug 44 is in its back position, as noted before, it is held there by the pressure of pawl 49 against lesser inclined surface 47. Now, when it is desired to clean the screens, air or other fluid supply under pressure is connected to the outer end of connection 25. The pressure thus received overcomes the holding action of pawl 49 which causes plug 44 to move back and close off duct 24. At the same time air is forced into top of chamber 17 through passage 20, and, as explained before, then passes through filter screens 15—12 and out cleanout passage 38, valve stem 29 having first been turned 90 degrees from that shown for it in Fig. 1.

Because of the difference in amount of inclination of surfaces 47 and 48, more pressure is required to push valve plug 44 to open or back position than required by the air pressure used for cleaning to push said plug to closed position, remembering that surface 47 has less inclination than surface 48.

Check valve 56 at the top of chamber 17 permits air to enter for the ready drainage by gravity of said chamber.

I claim:

1. An oil filtering device comprising a housing enclosing a chamber, means in the chamber for filtering the oil on its way through, said chamber having an inlet for receiving the oil on one side of the filtering means from the pressure side of a lubricating system, an outlet from the chamber to the lubricating system on the opposite side of the filtering means for the discharge of the oil after having passed through the filtering means, a duct connecting the outlet and inlet for bypassing the oil from the pressure side of the lubricating system to the outlet before passing to said opposite side of the filtering means, a valve for the duct having a movable part and a spring, said spring normally causing the movable part to set in position to prevent bypassing of oil through the duct during the filtering of the oil, said part moving against the pressure of the spring to set in position to open up the duct for the flow of oil through it to the outlet when the pressure in the chamber exceeds a predetermined amount due to the clogging of the filtering means, and detent mechanism releasably holding the movable part in fixed open position regardless of further fluctuations of pressure in the chamber, once said part has been actuated to set in open position.

2. An oil filtering device comprising a housing enclosing a chamber, means in the chamber for filtering the oil on its way through, said chamber having an inlet for receiving the oil on one side of the filtering means from the pressure side of a lubricating system, an outlet from the chamber to the lubricating system on the opposite side of the filtering means for the discharge of the oil after having passed through the filtering means, a duct connecting the outlet and inlet for bypassing the oil from the pressure side of the lubricating system to the outlet before passing to said opposite side of the filtering means, a valve for the duct having a movable part and a spring, said spring normally causing the movable part to set in closed position to prevent bypassing of the oil through the duct, and detent mechanism releasably engaging the movable part also to hold it in closed position, said part being forced, against the action of its spring and the holding action of the detent mechanism, to open position for opening the duct for the flow of the oil to the outlet when the pressure in the chamber exceeds a predetermined amount due to the clogging of the filtering means, said detent mechanism releasably holding said part in fixed open setting regardless of further fluctuations of pressure in the chamber, once said part has been actuated to open setting.

3. An oil filtering device comprising a housing enclosing a chamber, means in the chamber for filtering the oil on its way through, said chamber having an inlet for receiving the oil on one side of the filtering means from the pressure side of a lubricating system, an outlet from the chamber to the lubricating system on the opposite side of the filtering means for the discharge of the oil after having passed through the filtering means, a duct connecting the inlet to the outlet for bypassing the oil from the pressure side of the lubricating system to the outlet before passing to said opposite side of the filtering means, a valve plug slidably mounted in the duct, a spring normally holding the plug in a forward position for cutting off the flow through the duct, a spring actuated pawl also releasably holding the plug in forward position, said plug being forced to backward position for opening up the duct for the flow of the oil from the inlet to the outlet when the pressure in the chamber exceeds a predetermined amount due to the clogging of the filtering means, said pawl engaging the plug for yieldingly holding it in backward position, the resistance offered by the pawl against forward motion of the plugs being substantially less than against backward motion.

4. An oil filtering device comprising a housing enclosing a chamber, means in the chamber for filtering the oil on its way through, said chamber having an inlet for receiving the oil on one side of the filtering means from the pressure side of a lubricating system, an outlet from the chamber to the lubricating system on the opposite side of the filtering means for the discharge of the oil after having passed through the filtering means, a duct connecting the inlet to the outlet for bypassing the oil from the pressure side of the lubricating system to the outlet before passing to said opposite side of the filtering means, a valve for the duct having a movable part and a spring, said spring normally causing the movable part to set in closed position to prevent bypassing of the oil through the duct, and detent mechanism releasably engaging the movable part also to hold it in closed position, said part being forced, against the action of its spring and the holding action of the detent mechanism, to open position for opening the duct for the flow of the oil to the outlet when the pressure in the chamber exceeds a predetermined amount due to the clogging of the filtering means, and means for receiving fluid under pressure externally of the chamber and directing it against said part and into the outlet, said fluid, when received, forcing said part to closed position, said detent mechanism offering less resistance to the setting of the pressure means into closed position than to its setting into open position.

5. An oil filtering device comprising a housing enclosing a chamber, means in the chamber for filtering the oil, said chamber having an inlet for receiving the oil from the pressure side of a lubricating system and an outlet to the lubricating system for the discharge of the oil after having passed through the filtering means, a duct connecting the inlet with the outlet for the flow of oil between them without first flowing through the filtering means, a valve plug slidably mounted in the duct, a spring normally holding the plug in forward position for cutting off the flow through the duct, said plug being provided on its side with a pair of surfaces, one succeeding the other on the plug in a direction along its line of sliding, said surfaces extending transversely of the plug, one of said surfaces inclining with respect to said line from its base in a forward direction and the other in a backward direction, a spring actuated pawl for yieldingly pressing against said surfaces, said pawl engaging the surface with the forward inclination when the plug is in forward position, the plug being forced to backward position against the pressure of its spring and the resistance of the pawl when the pressure in the chamber exceeds a predetermined amount due to the clogging of the filtering means, the plug when moved to backward position opening up the duct for the flow of the oil to the outlet, said pawl engaging the surface with the backward inclination when the plug has been forced into backward position, and means for receiving fluid under pressure externally of the chamber, said latter means leading the fluid into the outlet and directing it against the plug causing the latter to move into forward position against the resistance of the pawl.

6. An oil filtering device comprising a housing enclosing a chamber, means in the chamber for filtering the oil, said chamber having an inlet for receiving the oil from the pressure side of a lubricating system and an outlet to the lubricating system for the discharge of the oil after having passed through the filtering means, a duct connecting the inlet with the outlet for the flow of oil between them without first flowing through the filtering means, a valve plug slidably mounted in the duct, a spring normally holding the plug in forward position for cutting off the flow through the duct, said plug being provided on its side with a pair of surfaces, one succeeding the other on the plug in a direction along its line of sliding, said surfaces extending transversely of the plug, one of said surfaces inclining with respect to said line from its base in a forward direction and the other in a backward direction, the angle of inclination of said latter surface with said line being less than that of the former surface, a pawl mounted to slide in a direction making a substantial angle with the line of sliding of the plug, a spring urging the pawl against the plug, said pawl engaging the surface with the greater angle of inclination when the plug is in forward position, the plug being forced to backward position against the pressure of its spring and the resistance of the pawl when the pressure in the chamber exceeds a predetermined amount due to the clogging of the filtering means, the plug when moved to backward position opening up the duct for the flow of the oil to the outlet, said pawl engaging the surface with the lesser angle of inclination when the plug has been forced into backward position, and means for receiving fluid under pressure externally of the chamber, said latter means leading the fluid into the outlet and directing it against the plug causing the latter to move into forward position against the resistance of the pawl.

7. An oil filtering device comprising a housing enclosing a chamber, means in the chamber for filtering the oil, the oil normally flowing through the filtering means from a first side thereof in the chamber to a second side thereof, an inlet to the chamber on said first side for receiving the oil from the pressure side of a lubricating system, and an outlet from the chamber to the system from a connection between said second side, said outlet and said first side for bypassing the oil from the pressure side of the lubricating system to the outlet without first having passed through the filtering means, means actuated by the pressure in the chamber on said first side normally closing off the connection between the outlet and said first side during the filtering of the oil, said latter means opening up the connection between the outlet and said first side for said bypassing when said pressure exceeds a predetermined amount due to the clogging of the filtering means, and a pressure actuated telltale control device receiving the pressure in chamber from said first side, the device being actuated to operate the telltale when the pressure in said first side exceeds a predetermined amount, said latter amount being less than the amount necessary for effecting said bypassing.

8. An oil filtering device comprising a housing enclosing a chamber, means in the chamber for filtering the oil on its way through said chamber having an inlet for receiving the oil on one side of the filtering means from the pressure side of a lubricating system, an outlet from the chamber to the lubricating system on the opposite side of the filtering means for the discharge of the oil after having passed through the filtering means, a duct connecting the inlet to the outlet for bypassing the oil from the pressure side of the lubricating system to the outlet before passing through the filtering means to said opposite side, a valve plug slidably mounted in the duct, a spring normally holding the plug in a forward position for cutting off the flow through the duct, a spring actuated pawl also releasably holding the plug in forward position, said plug being forced to backward position for opening up the duct for flow of the oil from the inlet to the outlet when pressure in the chamber exceeds a predetermined amount due to the clogging of the filtering means, said pawl engaging the plug for holding it in backward position.

9. An oil filtering device comprising a housing enclosing a chamber, means in the chamber for filtering the oil on its way through, said chamber having an inlet for receiving the oil on one side of the filtering means from the pressure side of a lubricating system, an outlet from the chamber to the lubricating system on the opposite side of the filtering means for the discharge of the oil after having passed through the filtering means, a duct connecting the inlet to the outlet for bypassing the oil from the pressure side of the lubricating system to the outlet before passing to said opposite side of the filtering means, a valve for the duct having a movable part and a spring, said spring normally causing the movable part to set in closed position to prevent bypassing of the oil through the duct, detent mechanism releasably engaging the movable part also to hold it in closed position, said part being forced, against the action of the spring and the holding action of the detent mechanism to open position for opening the duct for the flow of the oil to the outlet when the pressure in the chamber exceeds a predetermined amount due to the clogging of the filtering means, means in communication with said duct for receiving fluid under pressure externally of the chamber, and directing it through the outlet to the filtering means and forcing said part to closed position against the pressure of said spring and the holding action of the detent mechanism, and manually controlled valve means for closing off the inlet and the outlet from the lubricating system, and permitting the escape of the oil from the chamber from the inlet side.

MORRIS KATCHER.